(12) United States Patent
Saffert

(10) Patent No.: US 11,507,058 B2
(45) Date of Patent: Nov. 22, 2022

(54) METHOD FOR ASCERTAINING A ROUGH TRAJECTORY FROM A SPECIFIED CONTOUR

(71) Applicant: KEBA INDUSTRIAL AUTOMATION GERMANY GMBH, Lahnau (DE)

(72) Inventor: Eugen Saffert, Lahnau (DE)

(73) Assignee: KEBA INDUSTRIAL AUTOMATION GERMANY GMBH, Lahnau (DE)

( * ) Notice: Subject to any disclaimer, the term of this patent is extended or adjusted under 35 U.S.C. 154(b) by 0 days.

(21) Appl. No.: 17/260,447

(22) PCT Filed: Jun. 24, 2019

(86) PCT No.: PCT/EP2019/066604
§ 371 (c)(1),
(2) Date: Jan. 14, 2021

(87) PCT Pub. No.: WO2020/015951
PCT Pub. Date: Jan. 23, 2020

(65) Prior Publication Data
US 2021/0271226 A1   Sep. 2, 2021

(30) Foreign Application Priority Data

Jul. 17, 2018   (DE) .................... 10 2018 117 244.3

(51) Int. Cl.
*G05B 19/4103* (2006.01)
*G05B 19/408* (2006.01)

(52) U.S. Cl.
CPC ..... *G05B 19/4103* (2013.01); *G05B 19/4086* (2013.01); *G05B 2219/34098* (2013.01);
(Continued)

(58) Field of Classification Search
CPC ............ G05B 19/4103; G05B 19/4086; G05B 2219/34098; G05B 2219/34156;
(Continued)

(56) References Cited

U.S. PATENT DOCUMENTS

| 2012/0016514 A1* | 1/2012 | Nakamura | ......... G05B 19/4103 700/188 |
| 2013/0218323 A1* | 8/2013 | Otsuki | ............... G05B 19/4103 700/187 |
| 2019/0101888 A1* | 4/2019 | Konishi | ................. G05B 19/19 |

FOREIGN PATENT DOCUMENTS

| DE | 103 55 614 B4 | 11/2003 |
| DE | 10 2005 061 570 A1 | 12/2005 |

(Continued)

OTHER PUBLICATIONS

International Search Report and Written Opinion of International Application No. PCT/EP2019/066604, dated Jan. 23, 2020.
(Continued)

*Primary Examiner* — Kenneth M Lo
*Assistant Examiner* — Mohammed Shafayet
(74) *Attorney, Agent, or Firm* — Dinsmore & Shohl LLP

(57) ABSTRACT

The invention relates to a method for ascertaining a rough trajectory from a specified contour for controlling a machine tool which has at least two mutually redundant drive devices for carrying out superimposed movements, wherein the contour is determined by a contour function which is defined in portions at least by contour nodal points $P_0$-$P_{n+1}$ with ascending indices and contour portion functions $p_0$-$p_n$ assigned to the contour nodal points $P_0$-$P_{n+1}$ and has a contour starting nodal point $P_0$, wherein the rough trajectory is determined by a rough trajectory function which is defined in portions by rough trajectory nodal points $Q_0$ to $Q_{n+1}$ with ascending indices and has a rough trajectory starting nodal
(Continued)

Figure 1:
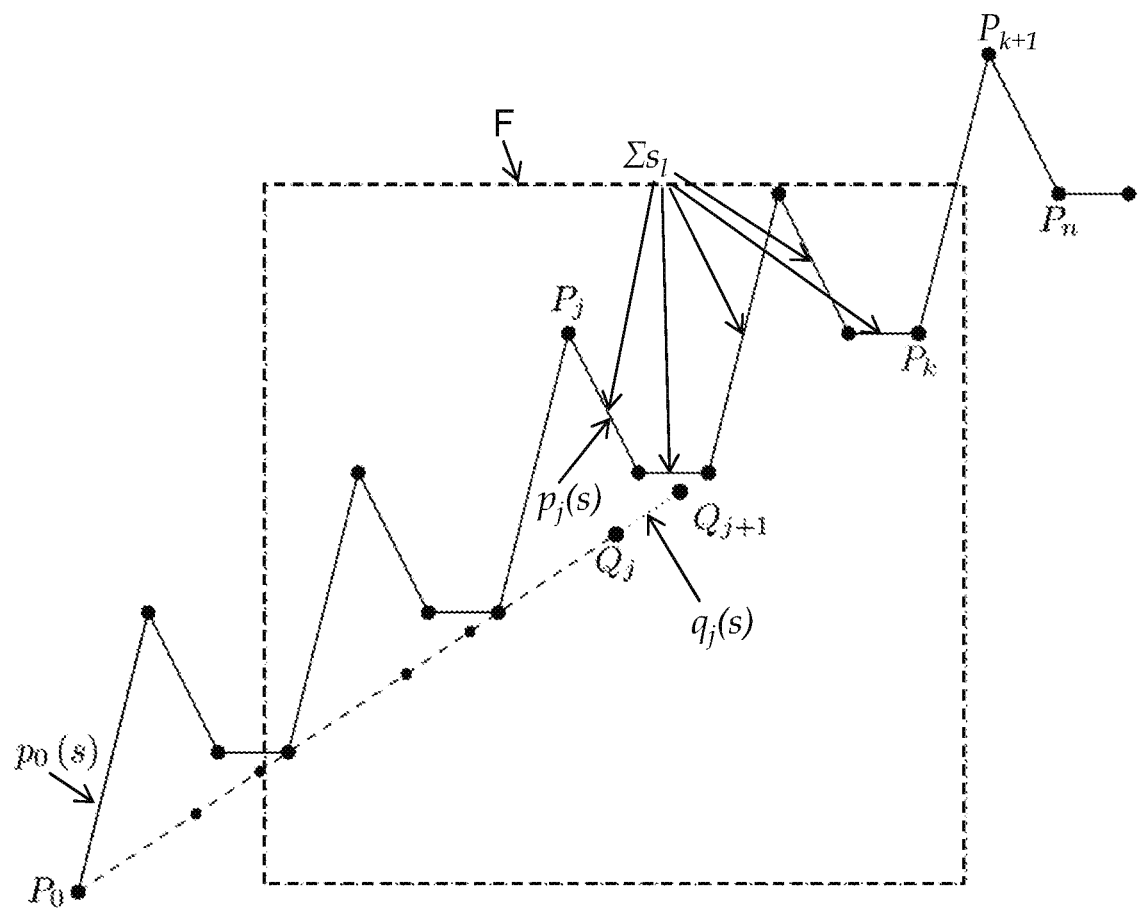

point $Q_0$, wherein the rough trajectory starting nodal point $Q_0$ is equated to the contour starting nodal point $P_0$ and then in a first iteration step, on the basis of the contour nodal points $P_j$ to $P_{n+1}$, the index value k of which is greater than or equal to the index value j of the respective rough trajectory starting nodal point that contour nodal point $P_k$ which has the smallest possible index value k and the distance of which from the rough trajectory starting nodal point $Q_j$ still just satisfies a specified distance condition is ascertained, and in a second iteration step, a respective following rough trajectory nodal point $Q_{j+1}$ which follows the respective rough trajectory starting nodal point $Q_j$ and lies on a connecting line between $Q_j$ and $P_k$ or between $Q_j$ and a centroid of the portion contour $P_j$ to $P_k$ is ascertained.

14 Claims, 2 Drawing Sheets

(52) U.S. Cl.
CPC .............. *G05B 2219/34156* (2013.01); *G05B 2219/42209* (2013.01); *G05B 2219/49284* (2013.01)

(58) Field of Classification Search
CPC ........... G05B 2219/42209; G05B 2219/49284; G05B 19/41
See application file for complete search history.

(56) References Cited

FOREIGN PATENT DOCUMENTS

| | | |
|---|---|---|
| EP | 0 594 699 B1 | 7/1992 |
| EP | 1 963 935 B1 | 12/2006 |
| JP | 2005118995 A | 5/2005 |
| JP | 2009521028 A | 5/2009 |

OTHER PUBLICATIONS

Bock, Marco Dipl. Math.; "Control of machine tools with redundant axes"; Aug. 2020, Dissertation.
Japanese Office Action corresponding to Japanese Patent App. No. 2021-524103 dated Mar. 9, 2022.

* cited by examiner

METHOD FOR ASCERTAINING A ROUGH TRAJECTORY FROM A SPECIFIED CONTOUR

CROSS REFERENCE TO RELATED APPLICATION

The present application is a National Phase Entry of International Application No. PCT/EP2019/066604, entitled "METHOD FOR DETERMINING A ROUGH TRAJECTORY FROM A PREDETERMINED CONTOUR" and filed on Jun. 24, 2019 and claims priority to German Application No. 102018117244.3, filed Jul. 17, 2018, each of which is incorporated by reference herein in its entirety.

The present invention relates to a method for ascertaining a rough trajectory from a specified contour for controlling a machine tool which has at least two mutually redundant drive devices for carrying out superimposed movements.

BACKGROUND OF THE INVENTION

Such machine tools are used for example in milling, laser cutting, water-jet cutting or engraving wood, metal or plastics workpieces or as drafting machines (plotters) in order to be able to produce workpieces or drawing lines having a specified two- or three-dimensional contour. A stationary or also a moving, in particular rotating, tool may be moved with the assistance of the drive devices along the specified contour, such that once machining is complete the workpiece has a desired final contour.

Depending on the course of the desired final contour, the tool often has to cover relatively large distances within a short time and is consequently also exposed to severe acceleration and/or deceleration forces. Machine tools which have just a single drive device for each desired direction of movement of the tool rapidly reach their limits of performance in this respect. The speed of machining often has to be reduced to below an acceptable level in order to remain within the speed and/or acceleration limits of the drive device.

This is avoided by using what are known as redundant drive devices for each direction of movement of the machine tool. To this end, a low-dynamic drive is provided which is capable of moving over relatively large displacements but, due to its relatively high mass, has only low motion dynamics. In addition, a second, high-dynamic drive is provided which, on the one hand, can be displaced by means of the low-dynamic drive and, on the other hand, is capable is displacing the tool at high speed and high acceleration or deceleration, wherein however the maximum displacement of the high-dynamic drive device is generally limited.

In order to be able to control such a machine tool with redundant drive devices for a respective direction of movement, it is conventional to divide the contour with which the workpiece is to be machined into a rough trajectory and a fine trajectory. The low-dynamic drive is here controlled with the rough trajectory data while the high-dynamic drive is simultaneously controlled with the fine trajectory data.

Dividing the contour into a rough trajectory and a fine trajectory and corresponding control of the machine tool is in principle known and is described for example in DE 103 55 614 B4 and EP 0 594 699 B1. When calculating the rough trajectory, at least the limited displacement of the high-dynamic drive must be taken into account since the workpiece would otherwise be incorrectly machined. Further limiting parameters are advantageously also taken into account in calculating the trajectory. This generally results in the rough trajectory comprising somewhat low-frequency motion components while the fine trajectory has high-frequency motion components. In general, the rough trajectory and the fine trajectory are calculated such that a rough trajectory is ascertained and then the fine trajectory is determined by subtracting the rough trajectory from the contour.

EP 1 963 935 B1 describes a further method for ascertaining for rough trajectory which is to be travelled in positionally guided manner. An initial trajectory to be travelled is here specified to a computer, wherein the initial trajectory is described by an initial function such that a corresponding position on the initial trajectory is in each case determined by inserting a scalar trajectory parameter into the initial function, wherein the scalar trajectory parameter is other than time and is characteristic of a path travelled along the initial trajectory. The computer subjects the initial trajectory to filtering with a low-pass characteristic as a function of the scalar trajectory parameter and in this manner ascertains a rough function, such that a corresponding position on the rough trajectory is in each case determined by inserting the scalar trajectory parameter into the rough function. The low-pass characteristic here relates to the scalar trajectory parameter. The computer ascertains the rough function such that the distance of the rough trajectory from the initial trajectory is always below a predetermined bound irrespective of the value of the scalar trajectory parameter.

In other words, EP 1 963 935 B1 proposes a method for calculating a rough function for travel by a low-dynamic drive which is calculated such that an initial trajectory dependent on a travel parameter is filtered in relation to this travel parameter. The low-pass filtered function is checked as to whether a distance of this function from the initial trajectory is below a predetermined bound over the entire range of the travel parameter. On the basis of the low-pass filtered function, further approximations may optionally gradually be carried out in order to ascertain the rough trajectory providing that the above-stated bound is observed.

The doctoral thesis "Steuerung von Werkzeugmaschinen mit redundanten Achsen" [control of machine tools with redundant axes] by Mr. Marco Bock of the faculty of mathematics and computer science, physics and geography at Justus Liebig University Gießen submitted in August 2010 (http://geb.uni-giessen.de/geb/volltexte/2011/7970/pdf/BockMarco_2010_11_19.pdf) describes various further methods for ascertaining a rough trajectory from a specified contour for controlling a machine tool.

According to a first exemplary embodiment, the rough function may be ascertained by initially ascertaining first characteristic intermediate vectors with control points of a spline representation of the initial trajectory. On this basis, second characteristic intermediate vectors which contain control points and define a second intermediate trajectory may be ascertained from the first characteristic intermediate vectors of the spline representation. The control points may be ascertained by weighted or unweighted averaging of pairs of immediately successive intermediate vectors of the first sequence. On this basis, third intermediate vectors may be calculated in corresponding manner. After this double determination of the intermediate trajectory, it must then be ascertained whether a geometric distance of the intermediate trajectory as a rough function from the initial trajectory is below the specified bound along the trajectory parameter. The spline vectors of the initial trajectory may to this end be compared with the spline vectors of the intermediate trajectory of the rough function, wherein the maximum value of these distances provides an upper distance limit which may in turn be compared with the bound for observance of the specified criterion.

In a second exemplary embodiment, respective trajectory positions on the initial trajectory may be ascertained for a plurality of scalar values of the trajectory parameter on the basis of a spline representation of the initial trajectory. On the basis of these pairs of values, a first intermediate trajectory is defined by the above-stated sampling. A second intermediate trajectory of the rough function within the interval of the scalar trajectory parameter may be determined by weighted or unweighted averaging of the positions on the first intermediate trajectory. The second intermediate trajectory may be compared with regard to observance of the bound with the initial trajectory or with the first sampled intermediate trajectory taking account of an auxiliary bound.

Depending on the specified contour, it may happen that known trajectory division methods are incapable of supplying satisfactory results. Under certain circumstances, known methods may be highly computationally intensive and require a correspondingly long computing time. It is also conceivable for the machining time arising from trajectory division not to correspond to the physical capabilities of the machine tool and thus to be extended.

The problem addressed by the invention is therefore that of providing a method of the initially stated kind which is improved in comparison with known methods.

SUMMARY OF THE INVENTION

The problem is solved by a method having the features of claim 1. Advantageous embodiments are indicated in the dependent claims.

A method is proposed for ascertaining a rough trajectory from a specified contour for controlling a machine tool which has at least two mutually redundant drive devices for carrying out superimposed movements, wherein the contour is determined by a contour function which is defined in portions at least by contour nodal points $P_0$ to $P_{n+1}$ with ascending indices and contour portion functions $p_0$ $p_n$ assigned to the contour nodal points $P_0$ to $P_{n+1}$ and has a contour starting nodal point $P_0$, wherein the rough trajectory is determined by a rough trajectory function which is defined in portions by rough trajectory nodal points $Q_0$ to $Q_{n+1}$ with ascending indices and has a rough trajectory starting nodal point $Q_0$, wherein first of all the rough trajectory starting nodal point $Q_0$ is equated to the contour starting nodal point $P_0$ and then, on the basis of a respective rough trajectory starting nodal point $Q_j$ and beginning at the rough trajectory starting nodal point $Q_0$, an iteration is carried out in which in a first iteration step, on the basis of the contour nodal points $P_j$ to $P_{n+1}$, the index value k of which is greater than or equal to the index value j of the respective rough trajectory starting nodal point that contour nodal point $P_k$ which has the lowest possible index value k and the distance of which from the rough trajectory starting nodal point $Q_j$ still just satisfies a specified distance condition, is ascertained, and in a second iteration step, a respective following rough trajectory nodal point $Q_{j+1}$ which follows the respective rough trajectory starting nodal point $Q_j$ and lies on a connecting line between the respective rough trajectory starting nodal point $Q_j$ and the contour nodal point $P_k$ ascertained in the first iteration step, or lies on a connecting line between the respective rough trajectory starting nodal point $Q_j$ and a centroid of the portion contour between $P_j$ and $P_k$, and the distance of which from the rough trajectory starting nodal point $Q_j$ corresponds to a factor-weighted distance of the contour nodal point $P_k$ ascertained in the first iteration step from the rough trajectory starting nodal point $Q_j$ is ascertained, wherein the factor is obtained from the quotient of the trajectory length $s_j$ of that contour portion function $p_j$, the index value j of which is equal to the index value j of the respective rough trajectory starting nodal point and the sum of trajectory lengths $s_j$ to $s_{k-1}$ of the contour portion functions $p_j$ to $p_{k-1}$ between the contour nodal point $P_j$, the index value j of which is equal to the index value j of the respective rough trajectory starting nodal point $Q_j$ and the contour nodal point $P_k$ ascertained in the first iteration step.

The proposed method is of a very simple structure and provides a definitive result for the rough trajectory after just one first pass. Multiple repeats of the calculations are not required. Recalculation or reparameterisation of the contour or starting trajectory into a form dependent on a scalar trajectory parameter is likewise not required, meaning that computing time can be saved right from the outset in comparison with known solutions.

The method is based on the surprisingly simple idea of constructing the rough trajectory iteratively, i.e. from nodal point to nodal point, on the basis of a starting point of the original contour. On the basis of the starting nodal point of the contour or a rough trajectory nodal point $Q_j$ calculated in a preceding iteration, a subsequent following rough trajectory nodal point $Q_{1+1}$ is ascertained. To this end, a window is arranged around the rough trajectory starting nodal point or the rough trajectory starting nodal point $Q_j$ such that all points located within this satisfy said specified distance condition. This distance condition is advantageously based on the maximum displacement of the high-dynamic drive, in order to ensure that all the target points corresponding to the contour can also actually be reached by the fine trajectory, which is after all the difference between the contour and the rough trajectory.

On the basis of the rough trajectory starting nodal point that nodal point $P_k$ of the contour is ascertained which still just remains within this window, i.e. the subsequent nodal point $P_{k+1}$ of the contour, namely that nodal point with an index value incremented by one, would already be situated outside this window. In practical terms, the first following point $P_{k+1}$ which no longer satisfies the distance condition is ascertained and then the preceding point is selected as point $P_k$.

Once this contour nodal point $P_k$ has been located, a notional line is drawn from the rough trajectory starting nodal point $Q_j$ to the identified contour nodal point $P_k$, wherein the new following rough trajectory nodal point $Q_{1+1}$ to be ascertained must be situated on this connecting line.

Alternatively, the notional line may also be drawn from the rough trajectory starting nodal point $Q_j$ to a centroid of the portion contour from contour nodal point $P_j$ to contour nodal point $P_k$, wherein the new following rough trajectory nodal point $Q_{1+1}$ to be ascertained must be situated on this connecting line. The centroid may for example be ascertained by geometric centroid formation of the starting contour portion between a contour point $P_j$ which is assigned to with the rough trajectory starting nodal point $Q_j$ or is geometrically closest thereto and the contour point $P_k$ which still just satisfies the distance criterion. In the simplest case, this may be the centre point of the contour portion between $P_j$ and $P_k$ but it may also be a geometric centroid of all intermediate contour points $P_j$, $P_{j+1}$ to $P_k$ on this contour portion. A centroid formed in this manner or also by another method serves to define the notional line extending from the rough trajectory starting nodal point $Q_j$ onto which the following rough trajectory nodal point $Q_{j+1}$ is allocated.

In this regard, on the basis of the rough trajectory starting nodal point the next rough trajectory starting nodal point $Q_{j+1}$ may follow either an elongate contour, in which the latter is located in the direction of the furthest distant point $P_k$ or be located in the direction of a contour centroid, which is in particular appropriate for highly undulating or angular contours.

The distance from the rough trajectory starting nodal point $Q_j$ required for uniquely defining the following rough trajectory nodal point $Q_{j+1}$ is determined by the distance of the located contour nodal point $P_k$ from the rough trajectory starting nodal point wherein this distance is weighted with a factor which is obtained from the quotient of the trajectory length $s_j$ of the contour portion function $p_j$, the index value j of which corresponds to the index value j of the respective rough trajectory starting nodal point $Q_j$ underlying the respective search procedure, and the sum S of the trajectory lengths $s_j$ to $s_{k-1}$ of the contour portion functions $p_j$ to $p_{k-1}$ between the contour nodal point $F_1$, the index value j of which corresponds to the index value j of the underlying trajectory starting nodal point $Q_j$ and the located contour nodal point $P_k$.

The following rough trajectory nodal point $Q_{1+1}$ ascertained in this manner becomes the new rough trajectory starting nodal point in a subsequent iteration.

In contrast with the prior art, the method according to the invention does not involve low-pass filtering by weighted or unweighted averaging of individual values. In addition, checking as to whether the distance of the rough trajectory from the contour is always below a predetermined bound independently of a value of a scalar trajectory parameter is not provided and is also not necessary since selecting the following rough trajectory nodal points during each iteration step in itself already ensures that the maximum displacement of the high-dynamic drive device is not exceeded.

It should be noted at this point that the stated contour which provides the basis for trajectory division according to the invention need not necessarily be the final contour of the workpiece to be machined. It is here optionally also possible to take account of material removal, for example brought about by the tool. For example, account may be taken of the diameter of the milling head when a milling cutter is used.

The contour function is advantageously a spline, in particular a first, third or fifth order spline. Such descriptions are conventionally used for example in CNC machining methods, wherein circles are generally described by a fifth order spline.

According to one advantageous development of the invention, the specified distance condition comprises at least a first and a second distance subcondition, wherein the contour nodal point $P_k$ to be ascertained must satisfy at least one of the distance subconditions, wherein the first distance subcondition requires that, for the contour nodal point $P_k$ to be ascertained, the sum of the trajectory lengths $s_j$-$s_k$ between the contour nodal point $P_j$, the index value j of which is equal to the index value j of the respective rough trajectory starting nodal point and the contour nodal point $P_k$ to be ascertained is less than or equal to a predetermined limit value $\Delta$ and the sum of the trajectory lengths $s_j$-$s_{k+1}$ between the contour nodal point $P_j$, the index value j of which is equal to the index value j of the respective rough trajectory starting nodal point and the contour nodal point $P_{k+1}$ immediately following the contour nodal point $P_k$ to be ascertained is greater than the predetermined limit value $\Delta$, and wherein the second distance subcondition requires that, for the contour nodal point $P_k$ to be ascertained, the distance between the contour nodal point $P_1$, the index value j of which is equal to the index value j of the respective rough trajectory starting nodal point and the respective rough trajectory starting nodal point $Q_j$ is less than or equal to half the predetermined limit value $\Delta$ and the distance between the contour nodal point $P_{k+1}$ immediately following the contour nodal point $P_k$ to be ascertained and the respective rough trajectory starting nodal point $Q_j$ is greater than half the predetermined limit value $\Delta$.

As has already been mentioned, the predetermined limit value $\Delta$ is appropriately based on the displacement of the high-dynamic drive device. While the first distance subcondition defines a bound for the trajectory lengths of the original contour, in straightforward terms the second distance subcondition defines the size of the respective search window.

Just one of the two above-stated conditions is regularly selected for all of the iteration steps in one pass of the method, wherein the condition may be selected from the outset or initially selected on the basis of contour characteristics. A combination of the two conditions may, however, also be used for a method sequence. It is furthermore conceivable to use the first condition and the second condition in portions. If the two distance subconditions locate different contour nodal points $P_k$, additional conditions may be defined and used as the basis for deciding which of the two points should be selected.

If, in the case of the first distance subcondition, it is not possible to locate a point which satisfies the condition or if the located contour nodal point has the same index value j as the rough trajectory starting nodal point the contour nodal point $P_{j+1}$ is selected as the contour nodal point $P_k$ to be ascertained. The distance stated in the second distance subcondition need not necessarily be a distance according to the Euclidean norm but may instead also be based on other norms, for example the maximum norm or the row-sum norm. If the Euclidean norm is used, the above-stated search window is circular in shape, while if the maximum norm is used, the search window is rectangular, in particular square. Since the displacements in the various directions of movement of the high-dynamic drive device are conventionally mutually independent, it is appropriate to define the distance according to the maximum or row-sum norm.

According to a further advantageous development, the rough trajectory function is furthermore defined by respective rough trajectory portion functions $q_0$-$q_n$ assigned to the rough trajectory nodal points $Q_0$-$Q_{n+1}$, wherein in the second iteration step the respective rough trajectory portion function $q_j$ assigned to the rough trajectory starting nodal point $Q_j$ is formed by a linear function. The rough trajectory portion functions $q_0$-$q_n$ thus connect the rough trajectory nodal points $Q_0$-$Q_{n+1}$ by respective straight lines.

According to an alternative development, it is also possible for the rough trajectory function furthermore to be defined by respective rough trajectory portion functions $q_0$ to $q_n$ assigned to the rough trajectory nodal points $Q_0$ to $Q_{n+1}$, this having been generated by means of a spline interpolation of the rough trajectory nodal points $Q_0$ to $Q_{n+1}$. A third or higher order spline is here advantageously used. While the above-stated linear functions may likewise be ascertained in the course of iteration, it may under certain circumstances be appropriate when ascertaining the rough trajectory portion functions not to carry out the spline interpolation until the rough trajectory nodal points have been ascertained.

DRAWINGS

Further advantages are revealed by the drawings and the associated description of the drawings. The drawings show exemplary embodiments of the invention. The drawings, description and claims contain numerous features in combination. A person skilled in the art will expediently also consider these features individually and combine them into meaningful further combinations.

Figure 2:
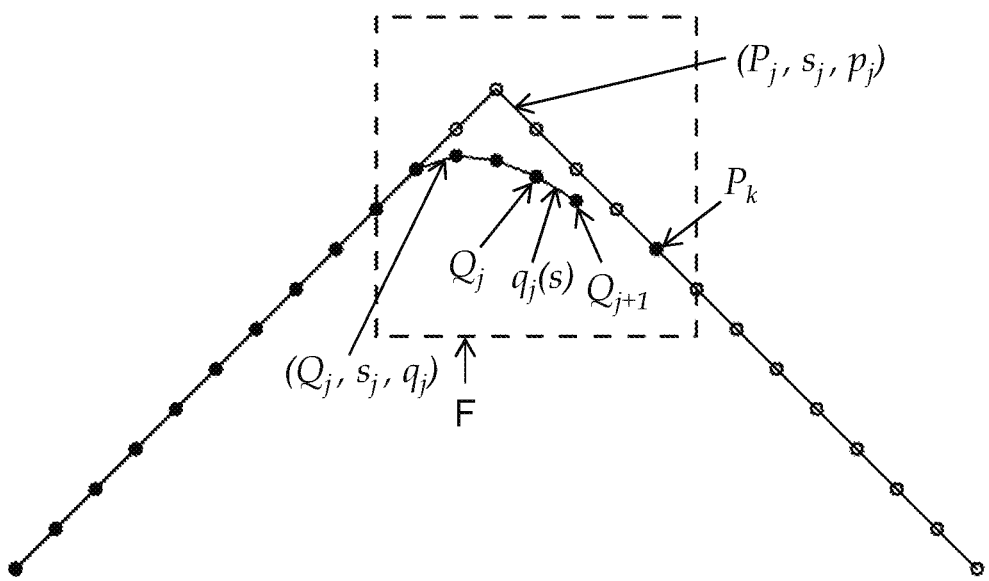

In the Figures:

FIG. 1 shows a schematic diagram of an iteration of a method according to the invention for ascertaining a rough trajectory, and FIG. 2 shows a schematic diagram of a specified contour and an associated rough trajectory ascertained by means of the method according to the invention.

The method according to the invention is described below by way of example on the basis of a trajectory division of a two-dimensional contour which is defined in an (X, Y) plane, wherein generalisation to other dimensions is, of course, possible. Trajectory division proceeds for example for a machine tool which has two redundant drive devices for each direction of movement. The contour may be described, for example, by first, third or fifth order splines, as is conventional for the operation CNC machine tools. Other contour descriptions may, however, also be available.

A contour portion j is defined by a starting point or contour nodal point $P_j=(x_j, y_j)$, a parameterisation interval $[0,s_j]$ and a contour portion function $p_j$, wherein $s_j$ is the arc length of the contour portion and the contour portion function $p_j$ describes the course of the contour portion. In the examples according to FIGS. 1 and 2, the functions $p_j$ are linear functions.

The contour for which the rough trajectory is to be ascertained is accordingly defined by a function $(P_j, s_j, p_j)$, j=n.

It should be noted that, instead of parameterisation on the basis of trajectory length $s_j$, it is also possible to select any desired other parameterisation, for example parameterisation with time or in Cartesian x, y coordinates.

The aim now, with the assistance of the method according to the invention, is to ascertain a smoothed rough trajectory $(Q_j, s_j, q_j)$, j=n for controlling the low-dynamic drive devices, such that the distance of this rough trajectory does not exceed a specified limit value. The rough trajectory must thus satisfy the following condition:

$\|p_j(s)-q_j(s)\| \leq \Delta, s \in [0,s_j], j=0,\ldots,n.$

The method according to the invention is an iterative method. A rough trajectory starting nodal point $Q_0$ is firstly equated to the starting nodal point $P_0$ of the contour. At least the following two steps are carried out within an iteration j.

In a first step, a first contour nodal point $P_k$ with k j which satisfies either the first or the second of the following two conditions is sought:

$$\sum_{l=j}^{k} s_l \leq \Delta, \sum_{l=j}^{k+1} s_l > \Delta, \quad (1)$$

$$\|P_k(s) - Q_j(s)\|_p \leq \frac{\Delta}{2}, \|P_{k+1}(s) - Q_j(s)\|_p > \frac{\Delta}{2}. \quad (2)$$

Just one of the two conditions 1 or 2 is regularly applied for one pass of the method. The condition to be applied may be permanently set or be selected on the basis of contour characteristics such as continuity, curvature behaviour etc. It is also conceivable for one of the two conditions to be applied in portions.

If no such point can be located for condition (1), or if k=j for condition (2), the contour nodal point $P_k$ to be ascertained is defined as the contour nodal point $P_{j+1}$.

FIG. 1 illustrates ascertaining the contour nodal point $P_k$ with the lowest possible index value k for p=∞, i.e. the maximum norm. By calculating the distance according to the maximum norm, a search window F within which the contour nodal point to be ascertained must be situated has the shape of a square with edge length Δ. As is clearly apparent from FIG. 1, point $P_k$ is still just within the search window F, while the next point $P_{k+1}$ is already situated outside the search window. In this respect, the contour nodal point $P_k$ which still just satisfies a distance norm is sought, while the next point $P_{k+1}$ already no longer satisfies said norm. In practical terms, the point $P_{k+1}$ is firstly sought as the point which breaches distance condition and thus identifies the preceding point $P_k$.

In a second iteration step, the equation $$S = \sum_{l=j}^{k-1} s_l,$$

calculates the sum S of the trajectory lengths $s_j$ to $s_k$ of the contour portion functions $p_j$ to $p_k$ between the contour nodal point $P_j$, the index value j of which is equal to the index value j of the respective rough trajectory starting nodal point $Q_j$ and the contour nodal point $P_k$ ascertained in the first iteration step. The summed trajectory lengths $s_j$ to $s_k$ are denoted $\Sigma s_l$ in FIG. 1. On the basis of S, $s_j$, $Q_j$ and $P_k$, a following rough trajectory nodal point $$Q_{j+1} = Q_j + \frac{s_j}{S}(P_k - Q_j)$$

and an assigned rough trajectory portion function $$q_j(s) = Q_j + \frac{s}{s_j}(Q_{j+1} - Q_j)$$

are ascertained.

The dashed line which connects the rough trajectory starting nodal point $Q_j$ and the following rough trajectory nodal point $Q_{j+1}$ represents the rough trajectory portion function $q_j$.

The next iteration j+1 is then carried out, wherein the value of the following rough trajectory nodal point $Q_{1+1}$ ascertained in iteration j forms the new rough trajectory starting nodal point in the next iteration j+1.

FIG. 2 shows is a further contour $(P_j, s_j, p_j)$ for which a rough trajectory $(Q_j, Q_j)$ is likewise ascertained by the method according to the invention.

Ascertaining respective rough trajectory nodal points $Q_{j+1}$ on the basis of a rough trajectory starting nodal point $Q_j$ by locating a contour nodal point $P_k$ still just within the search window F and the associated rough trajectory portion function $q_j(s)$ here proceeds in the same manner as has been described with reference to FIG. 1.

The invention claimed is:

1. A method for controlling a machine tool having at least two mutually redundant drive devices for carrying out superimposed movements following a contour function, the method comprising:
   determining a specified contour for controlling the machine tool by the contour function defined in portions by contour nodal points ($P_0$-$P_{n+1}$) with ascending indices and contour portion functions ($p_0$-$p_n$) assigned to the contour nodal points ($P_0$-$P_{n+1}$) and has a contour starting nodal point ($P_0$);
   determining a rough trajectory by a rough trajectory function defined in portions by rough trajectory nodal points ($Q_0$-$Q_{n+1}$) with ascending indices, the rough trajectory having a rough trajectory starting nodal point ($Q_0$);
   equating the rough trajectory starting nodal point ($Q_0$) to the contour starting nodal point ($P_0$);
   carrying out an iteration process comprising a first iteration step and a second iteration step based on a respective rough trajectory starting nodal point ($Q_j$) and beginning at the rough trajectory starting nodal point ($Q_0$), wherein:
      the first iteration step comprises ascertaining, based on the contour nodal points ($P_j$-$P_n$) having an index value (k) greater than or equal to an index value (j) of the respective rough trajectory starting nodal point ($Q_j$), a contour nodal point ($P_k$) having a lowest possible index value (k) and a distance of the contour nodal point ($P_k$) from the rough trajectory starting nodal point ($Q_j$) satisfies a specified distance condition, and
      the second iteration step comprises ascertaining a respective following rough trajectory nodal point ($Q_{j+1}$) which follows the respective rough trajectory starting nodal point ($Q_j$) and lies on a first connecting line between the respective rough trajectory starting nodal point ($Q_j$) and the contour nodal point ($P_k$) ascertained in the first iteration step, or lies on a second connecting line between the respective rough trajectory starting nodal point ($Q_j$) and a centroid of a portion contour between the contour nodal point ($P_j$) and the contour nodal point ($P_k$), and the distance of the contour nodal point ($P_k$) from the rough trajectory starting nodal point ($Q_j$) corresponds to a factor-weighted distance of the contour nodal point ($P_k$) ascertained in the first iteration step from the rough trajectory starting nodal point ($Q_j$), wherein the factor is obtained from a quotient of trajectory length ($s_j$) of the contour portion function ($p_j$), the index value (j) of the trajectory length ($s_j$) of the contour portion function ($p_j$) is equal to the index value (j) of the respective rough trajectory starting nodal point ($Q_j$), and ascertaining a sum of trajectory lengths ($s_j$-$s_{k-1}$) of the contour portion functions ($p_j$-$p_{k-1}$) between the contour nodal point ($P_j$) and the contour nodal point ($P_k$) ascertained in the first iteration step, where the index value (j) of the contour nodal point ($P_j$) is equal to the index value (j) of the respective rough trajectory starting nodal point ($Q_j$); and
   directing the movement of one of the at least two mutually redundant drive devices based on the ascertained rough trajectory nodal point ($Q_{j+1}$).

2. The method of claim 1, wherein the contour function is a spline.

3. The method of claim 2, wherein the spline is a first order spline, a third order spline, or fifth order spline.

4. The method of claim 1, wherein the specified distance condition comprises a first and a second distance subcondition, wherein the contour nodal point ($P_k$) to be ascertained must satisfy at least one of the distance subconditions, wherein the first distance subcondition requires that, for the contour nodal point ($P_k$) to be ascertained, a sum of the trajectory lengths ($s_j$-$s_k$) between the contour nodal point ($P_j$), the index value (j) of the sum of the trajectory lengths ($s_j$-$s_k$) between the contour nodal point ($P_j$) is equal to the index value (j) of the respective rough trajectory starting nodal point ($Q_j$), and the contour nodal point ($P_k$) to be ascertained is less than or equal to a predetermined limit value ($\Delta$) and a sum of the trajectory lengths ($s_j$-$s_{k+1}$) between the contour nodal point ($P_j$), the index value (j) of the sum of the trajectory lengths ($s_j$-$s_{k+1}$) between the contour nodal point ($P_j$) is equal to the index value (j) of the respective rough trajectory starting nodal point ($Q_j$), and the contour nodal point ($P_{k+1}$) immediately following the contour nodal point ($P_k$) to be ascertained is greater than the predetermined limit value ($\Delta$), and wherein the second distance subcondition requires that, for the contour nodal point ($P_k$) to be ascertained, the distance between the contour nodal point ($P_j$), the index value (j) of the contour nodal point ($P_j$) equal to the index value (j) of the respective rough trajectory starting nodal point ($Q_j$), and the respective rough trajectory starting nodal point ($Q_j$) is less than or equal to half the predetermined limit value ($\Delta$) and the distance between the contour nodal point ($P_{k+1}$) immediately following the contour nodal point ($P_k$) to be ascertained and the respective rough trajectory starting nodal point ($Q_j$) is greater than half the predetermined limit value ($\Delta$).

5. The method of claim 4, wherein the predetermined limit value ($\Delta$) corresponds to a maximum displacement of one of the redundant drive devices.

6. The method of claim 1, wherein the rough trajectory function is further defined by respective rough trajectory portion functions ($q_0$-$q_n$) assigned to the rough trajectory nodal points ($Q_0$-$Q_{n+1}$) such that in the second iteration step, the respective rough trajectory portion function ($q_j$) assigned to the respective rough trajectory starting nodal point ($Q_j$) is formed by a linear function.

7. The method of claim 1, wherein the rough trajectory function is further defined by respective rough trajectory portion functions ($q_0$-$q_n$) assigned to the rough trajectory nodal points ($Q_0$-$Q_{n+1}$) generated via a spline interpolation of the rough trajectory nodal points ($Q_0$-$Q_n$).

8. A system for controlling a machine tool, the system comprising:
   the machine tool comprising at least two mutually redundant drive devices for carrying out superimposed movements following a contour function; and
   a computer numerical control (CNC) device configured to:
      determine a specified contour for controlling the machine tool by the contour function defined in portions by contour nodal points ($P_0$-$P_{n+1}$) with ascending indices and contour portion functions ($p_0$-$p_n$) assigned to the contour nodal points ($P_0$-$P_{n+1}$) and has a contour starting nodal point ($P_0$),
      determine a rough trajectory by a rough trajectory function defined in portions by rough trajectory nodal points ($Q_0$-$Q_{n+1}$) with ascending indices, the rough trajectory having a rough trajectory starting nodal point ($Q_0$), equate the rough trajectory starting nodal point ($Q_0$) to the contour starting nodal point ($P_0$), carry out an iteration process comprising a first iteration step and a second iteration step based on a respective rough trajectory starting nodal point ($Q_j$) and beginning at the rough trajectory starting nodal point ($Q_0$), wherein:

the first iteration step comprises ascertaining, based on the contour nodal points ($P_j$-$P_n$) having an index value (k) greater than or equal to an index value (j) of the respective rough trajectory starting nodal point ($Q_j$), a contour nodal point ($P_k$) having a lowest possible index value (k), and a distance of the contour nodal point ($P_k$) from the rough trajectory starting nodal point ($Q_j$) that satisfies a specified distance condition, and the second iteration step comprises ascertaining a respective following rough trajectory nodal point ($Q_{j+1}$) which follows the respective rough trajectory starting nodal point ($Q_j$) and lies on a first connecting line between the respective rough trajectory starting nodal point ($Q_j$) and the contour nodal point ($P_k$) ascertained in the first iteration step, or lies on a second connecting line between the respective rough trajectory starting nodal point ($Q_j$) and a centroid of a portion contour between the contour nodal point ($P_j$) and the contour nodal point ($P_k$), and the distance of the contour nodal point ($P_k$) from the rough trajectory starting nodal point ($Q_j$) corresponds to a factor-weighted distance of the contour nodal point ($P_k$) ascertained in the first iteration step from the rough trajectory starting nodal point ($Q_j$), wherein the factor is obtained from a quotient of trajectory length ($s_j$) of the contour portion function ($p_j$), where the index value (j) of the trajectory length ($s_j$) of the contour portion function ($p_j$) is equal to the index value (j) of the respective rough trajectory starting nodal point ($Q_j$), and ascertaining a sum of trajectory lengths ($s_j$-$s_{k-1}$) of the contour portion functions ($p_j$-$p_{k-1}$) between a contour nodal point ($P_j$) of the contour nodal points ($P_j$-$P_n$) and the contour nodal point ($P_k$) ascertained in the first iteration step, where the index value (j) of the trajectory length ($s_j$) of the contour portion function ($p_j$) is equal to the index value (j) of the respective rough trajectory starting nodal point ($Q_j$), and direct the movement of one of the at least two mutually redundant drive devices based on the ascertained rough trajectory nodal point ($Q_{j+1}$).

9. The system of claim 8, wherein the contour function is a spline.

10. The system of claim 9, wherein the spline is a first order spline, a third order spline, or fifth order spline.

11. The system of claim 8, wherein the specified distance condition comprises a first and a second distance subcondition, wherein the contour nodal point ($P_k$) to be ascertained must satisfy at least one of the distance subconditions, wherein the first distance subcondition requires that, for the contour nodal point ($P_k$) to be ascertained, a sum of the trajectory lengths ($s_j$-$s_k$) between the contour nodal point ($P_j$), the index value (j) of which the sum of the trajectory lengths ($s_j$-$s_k$) between the contour nodal point ($P_j$) is equal to the index value (j) of the respective rough trajectory starting nodal point ($Q_j$), and the contour nodal point ($P_k$) to be ascertained is less than or equal to a predetermined limit value ($\Delta$) and a sum of the trajectory lengths ($s_j$-$s_{k+1}$) between the contour nodal point ($P_j$), the index value (j) of the sum of the trajectory lengths ($s_j$-$s_{k+1}$) between the contour nodal point ($P_j$) is equal to the index value (j) of the respective rough trajectory starting nodal point ($Q_j$), and the contour nodal point ($P_{k+1}$) immediately following the contour nodal point ($P_k$) to be ascertained is greater than the predetermined limit value ($\Delta$), and wherein the second distance subcondition requires that, for the contour nodal point ($P_k$) to be ascertained, the distance between the contour nodal point ($P_j$), the index value (j) of the contour nodal point ($P_j$) equal to the index value (j) of the respective rough trajectory starting nodal point ($Q_j$), and the respective rough trajectory starting nodal point ($Q_j$) is less than or equal to half the predetermined limit value ($\Delta$) and the distance between the contour nodal point ($P_{k+1}$) immediately following the contour nodal point ($P_k$) to be ascertained and the respective rough trajectory starting nodal point ($Q_j$) is greater than half the predetermined limit value ($\Delta$).

12. The system of claim 11, wherein the predetermined limit value ($\Delta$) corresponds to a maximum displacement of one of the redundant drive devices.

13. The system of claim 8, wherein the rough trajectory function is further defined by respective rough trajectory portion functions ($q_0$-$q_n$) assigned to the rough trajectory nodal points ($Q_0$-$Q_{n+1}$) such that in the second iteration step, the respective rough trajectory portion function ($q_j$) assigned to the respective rough trajectory starting nodal point ($Q_j$) is formed by a linear function.

14. The system of claim 8, wherein the rough trajectory function is further defined by respective rough trajectory portion functions ($q_0$-$q_n$) assigned to the rough trajectory nodal points ($Q_0$-$Q_{n+1}$) generated via a spline interpolation of the rough trajectory nodal points ($Q_0$-$Q_n$).

* * * * *